(12) United States Patent  
Elazary et al.

(10) Patent No.: US 12,358,412 B2  
(45) Date of Patent: Jul. 15, 2025

(54) ROBOTS FOR THREE-DIMENSIONAL SORTATION

(71) Applicant: InVia Robotics, Inc., Westlake Village, CA (US)

(72) Inventors: Lior Elazary, Agoura Hills, CA (US); Joseph Traverso, Simi Valley, CA (US); James Anderson, Oak Park, CA (US); Randolph Charles Voorhies, Newbury Park, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 712 days.

(21) Appl. No.: 17/721,598

(22) Filed: Apr. 15, 2022

(65) Prior Publication Data

US 2023/0331484 A1 Oct. 19, 2023

(51) Int. Cl.
| | |
|---|---|
| *B60P 1/04* | (2006.01) |
| *B25J 5/00* | (2006.01) |
| *B60P 1/02* | (2006.01) |
| *B60P 1/28* | (2006.01) |
| *B60P 1/34* | (2006.01) |

(Continued)

(52) U.S. Cl.
CPC ............... *B60P 1/04* (2013.01); *B25J 5/007* (2013.01); *B60P 1/02* (2013.01); *B60P 1/283* (2013.01); *B60P 1/34* (2013.01); *B60P 1/4414* (2013.01); *B65G 1/0492* (2013.01); *B65G 1/1371* (2013.01); *B65G 1/1375* (2013.01);

(Continued)

(58) Field of Classification Search
CPC .. B65G 1/1375; B65G 1/0492; B65G 1/1371; B65G 1/04; B65G 47/965; B25J 5/007; B60P 1/02; B60P 1/283; B60P 1/34; B60P 1/4414; B60P 1/04; B66F 7/0666; B66F 9/063; B66F 9/0755; B66F 9/18
See application file for complete search history.

(56) References Cited

U.S. PATENT DOCUMENTS 3,944,284 A * 3/1976 Kent ..................... B60P 1/30  
414/420  
5,474,415 A * 12/1995 Becker ................ B65G 47/962  
198/465.1

(Continued)

FOREIGN PATENT DOCUMENTS

CN 109422210 A * 3/2019 ............ B66F 7/0625

*Primary Examiner* — Thomas Randazzo  
(74) *Attorney, Agent, or Firm* — Ansari Katiraei LLP; Arman Katiraei; Sadiq Ansari

(57) ABSTRACT

Disclosed is a robot for performing three-dimensional ("3D") or multi-plane sortation and/or order fulfillment. The robot may include a motorized base to move about a first plane, a lift that raises and lowers a dispensing receptacle atop the lift about a second plane, and one or more actuators that modify a position of the dispensing receptacle from an upright position to a first tilted position in which the dispensing receptacle is tilted towards a first side of the robot and to a second tilted position in which the dispensing receptacle is tilted towards an opposite second side of the robot. The robot may receive and carry items when the dispensing receptacle is in the upright position, and may dispense the items to a destination on either side of the robot by tilting the dispensing receptacle to the first tilted position or the second tilted position.

19 Claims, 13 Drawing Sheets

(51) Int. Cl.
*B60P 1/44* (2006.01)
*B65G 1/04* (2006.01)
*B65G 1/137* (2006.01)
*B65G 47/96* (2006.01)
*B66F 7/06* (2006.01)
*B66F 9/06* (2006.01)
*B66F 9/075* (2006.01)

(52) U.S. Cl.
CPC .......... *B65G 47/965* (2013.01); *B66F 7/0666* (2013.01); *B66F 9/063* (2013.01); *B66F 9/0755* (2013.01)

(56) References Cited

U.S. PATENT DOCUMENTS

| | | | |
|---|---|---|---|
| 5,542,806 A * | 8/1996 | Kang | B66F 7/0633 |
| | | | 414/678 |
| 2020/0061838 A1* | 2/2020 | Amacker | B25J 9/1697 |
| 2020/0238505 A1* | 7/2020 | Parks, II | B25J 9/0027 |
| 2020/0339350 A1* | 10/2020 | Dooley | B65G 65/02 |
| 2020/0384637 A1* | 12/2020 | Asada | B25J 9/1065 |
| 2022/0292444 A1* | 9/2022 | Sui | G05D 1/0094 |
| 2023/0102469 A1* | 3/2023 | Kim | B07C 5/362 |
| | | | 209/552 |

* cited by examiner

ROBOTS FOR THREE-DIMENSIONAL SORTATION

BACKGROUND

Conveyor systems have been developed to sort items for different orders along a single plane. Different positions along a conveyor may be assigned to fulfill different customer orders. The items for the different customer orders may be retrieved from different storage locations and placed onto the conveyor. The conveyor then moves the items past each of the order fulfillment positions. When an item of a particular order reaches a position along the conveyor where that particular order is being fulfilled, manual or automated means may be used to take the item off the conveyor and to group it with other items of the particular order.

There is a limited number of orders that may be fulfilled at any given time using the conveyor system. The limitation is due to a variety of factors including the length and single plane operation of the conveyor that limits the number of order fulfillment positions that can be allocated along the conveyor.

DETAILED DESCRIPTION OF PREFERRED EMBODIMENTS

The following detailed description refers to the accompanying drawings. The same reference numbers in different drawings may identify the same or similar elements.

Provided are specialized robots for performing three-dimensional ("3D") or multi-plane sortation. The 3D sortation robots may operate using a motorized base, a lift, and a dispensing receptacle attached to the lift. The motorized base moves the 3D sortation robot and the dispensing receptacle about a first plane (e.g., the x-coordinate and y-coordinate plane). The lift raises and lowers the dispensing receptacle about a second plane (e.g., the z-coordinate plane). Together, the motorized base and lift, may position the dispensing receptacle at a particular x, y, and z position in 3D space or adjacent to a particular destination about the first plane and the second plane. The 3D sortation robot may then activate the dispensing receptacle to dispense items contained therein to the particular destination. In this manner, the 3D sortation robot may sort items to any location about the first plane and the second plane and is not limited to locations about a single plane.

Figure 1:
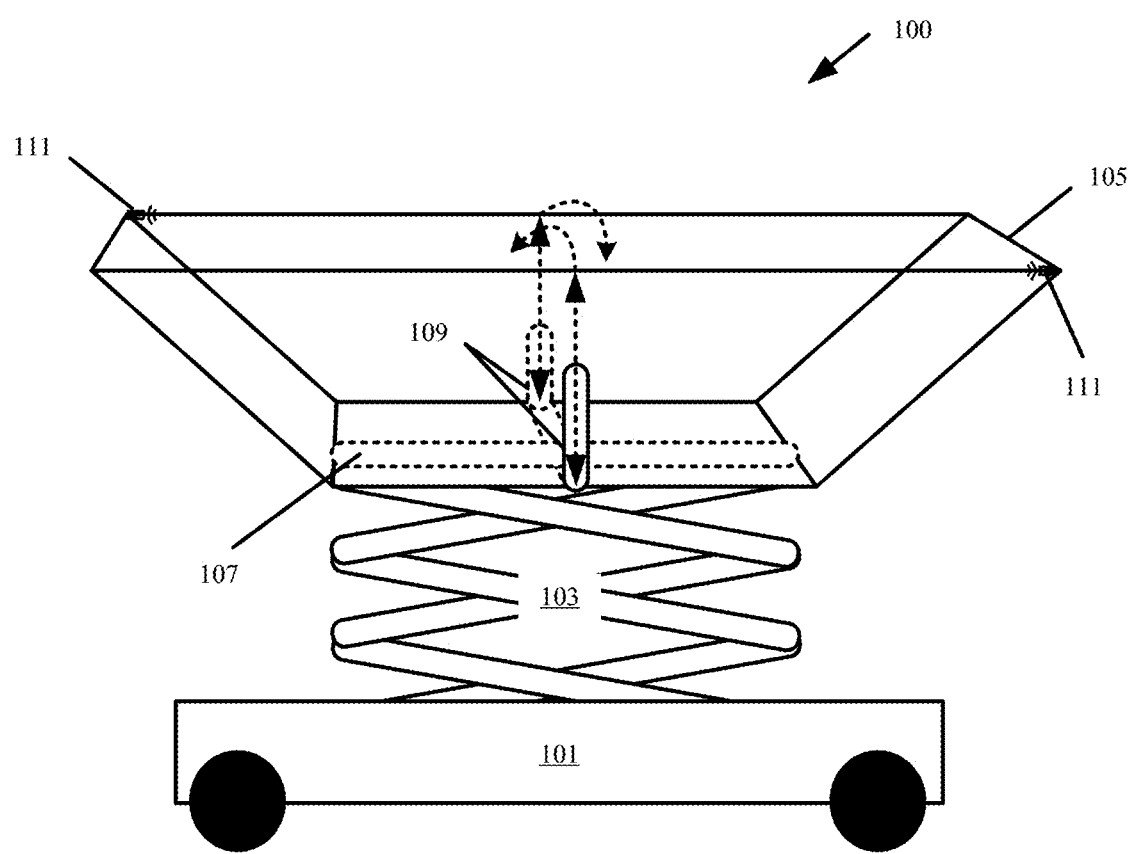
FIG. 1 illustrates an example of a 3D sortation robot in accordance with some embodiments presented herein.
Figure 2:
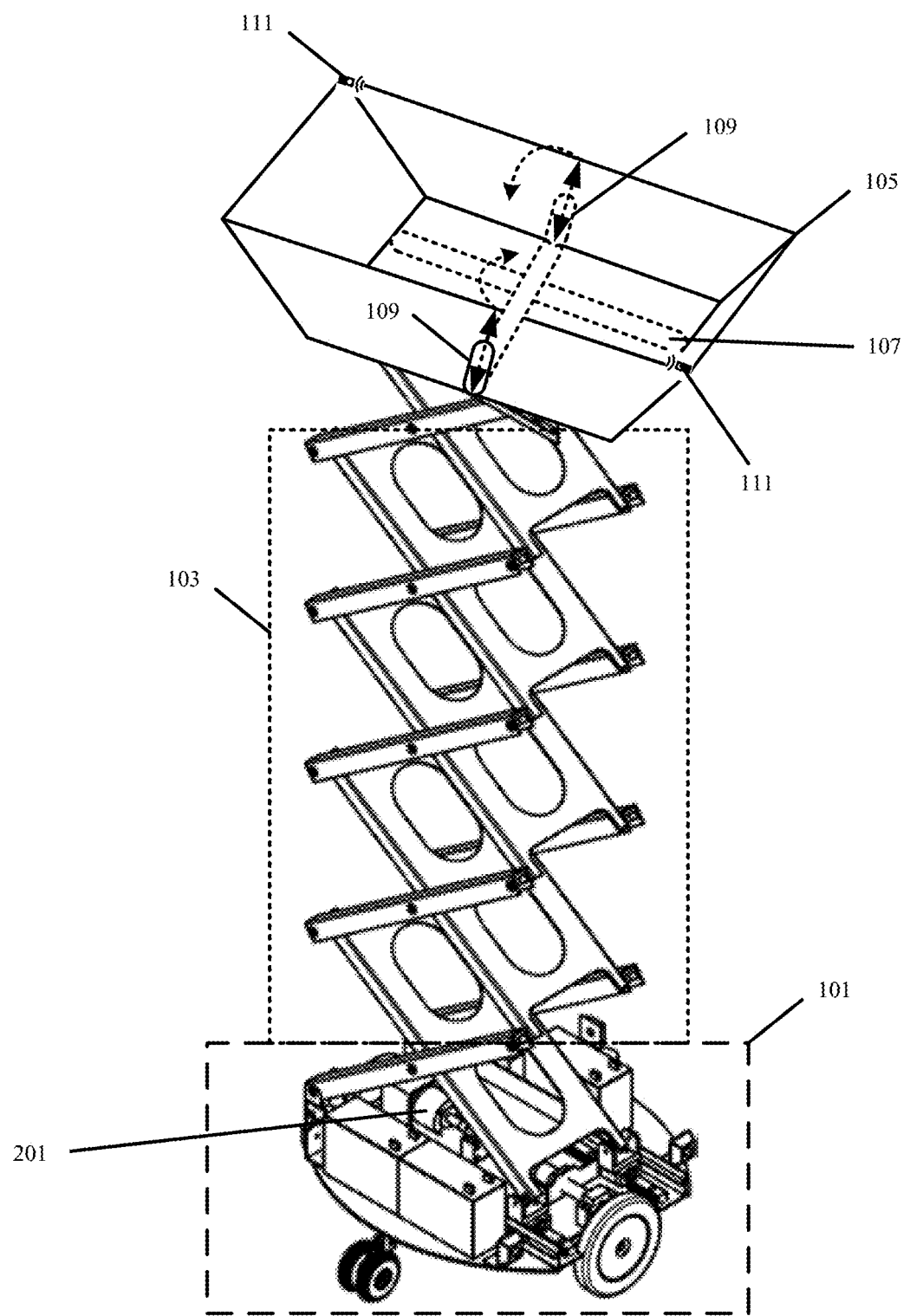
FIG. 2 provides a perspective view of the 3D sortation robot in an expanded or raised state in accordance with some embodiments presented herein.

FIG. 1 illustrates an example of 3D sortation robot 100 in accordance with some embodiments presented herein. FIG. 2 provides a perspective view of 3D sortation robot 100 in an expanded or raised state in accordance with some embodiments presented herein. 3D sortation robot 100 may include motorized base 101, lift 103, and dispensing receptacle 105.

Figure 3:
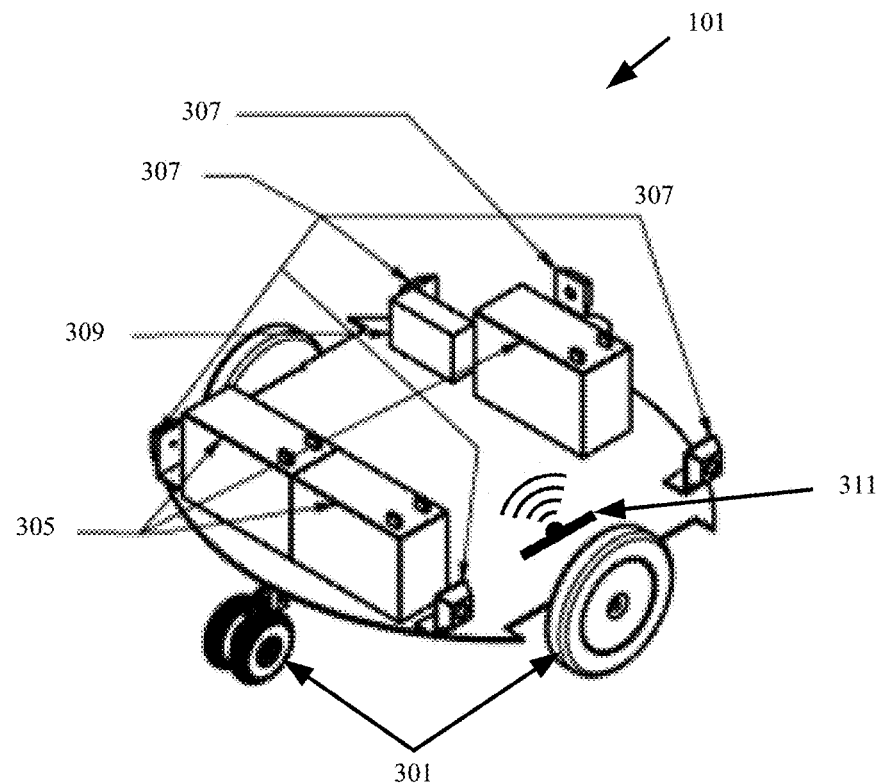
FIG. 3 illustrates top and bottom views for the motorized base of the 3D sortation robot in accordance with some embodiments presented herein.
Figure 3:
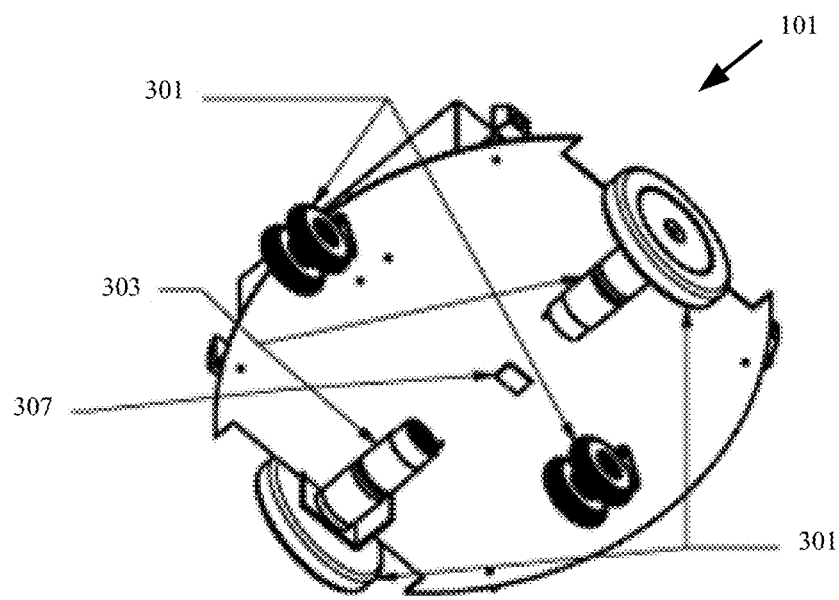

FIG. 3 illustrates top and bottom views for motorized base 101 of 3D sortation robot 100 in accordance with some embodiments presented herein. Motorized base 101 may include wheels 301, one or more drive motors 303, and power supply 305. Power supply 305 may be a battery or other energy storage apparatus that supplies power to drive motors 303 and/or other electronic or powered components of 3D sortation robot 100. Drive motors 303 may power wheels 301, and move 3D sortation robot 100 about a first plane that may be defined using x and y coordinates.

In some embodiments, motorized base 101 may house additional components of 3D sortation robot 100. For instance, motorized base 101 may include one or more sensors and actuators 307 that aid in navigation and obstacle avoidance. Sensors 307 may include cameras, accelerometers, speedometers, depth and/or three-dimensional sensors, light detection and ranging ("LiDAR"), radio detecting and ranging ("RADAR"), tilt sensor, inertial sensor, thermometer, and/or other devices that measures a physical property with which 3D sortation robot 100 regulates speed, direction, turning, and/or other movements of motorized base 101.

Motorized base 101 may also house one or more processors 309 that control operations of 3D sortation robot 100, including controlling movements of 3D sortation robot 100 by regulating power that is provided to drive motors 303 and/or other sensors and actuators 307 of 3D sortation robot 100. Processors 309 may collect sensory data from one or more sensors 307 in motorized base 101, elsewhere on 3D sortation robot 100, and/or remote sensors (e.g., positional beacons in a site) in order to control the movements of motorized base 101 and/or other sensors or actuators used in detecting, retrieving, and/or placing objects in a site.

In some embodiments, motorized base 101 may include one or more radios 311 for wireless communications with other robots, a controller, and/or other network-enabled devices. 3D sortation robot 100 may receive instructions for receiving items from a first location and for dispensing the received items at a position about first and second coordinate planes using radios 311, wherein the first coordinate plane may specify an x and y coordinate or position about a ground surface, and the second coordinate plane may specify a z coordinate position or elevation above the ground surface at which to dispense the received items. 3D sortation robot 100 may provide data regarding execution of tasks to other devices via radios 311.

In some embodiments, motorized base 101 may include other means of locomotion besides or in addition to the aforementioned wheels. For instance, motorized base 101 may include tracks, two or more articulating legs, propellers, and/or other mechanical forms of locomotion for moving about the first plane.

Although not shown in FIG. 3, lift 103 may be attached about centrally and atop motorized base 101. Lift 103 may be bolted on or otherwise affixed to motorized base 101. Lift 103 may be an extensible and/or collapsible structure that raises or lowers to a plurality of different heights. In some embodiments, lift 103 may extend to a height of ten feet above the first plane. In some other embodiments, lift 103 may be configured to reach greater heights if necessary.

Lift 103 may raise or lower dispensing receptacle 105 to any of the plurality of different heights using one or more lift motors (e.g., motor 201 in FIG. 2) that are located on motorized base 101. In some embodiments, lift motors 201 may raise or lower dispensing receptacle 105 using a pneumatic force, piston, drive chain, rotating motor and/or gear, screw-based mechanism, piston, and/or other mechanical element. Lift 103 may include metal, plastic, and/or other rigid elements that are arranged in a collapsible manner, and that support raising and lowering lift 103 with heavy objects (e.g., objects weighing under one hundred pounds) disposed within dispensing receptacle 105.

As shown in FIGS. 1 and 2, lift 103 may be a scissor lift with an extensible, collapsible, and/or folding framework. In some other embodiments, lift 103 may be a vertical rail-based structure, spiral structure, or other extensible structure.

Dispensing receptacle 105 may be attached to lift 103. Dispensing receptacle 105 may be repositioned about the first plane by movements of motorized base 101, and may be repositioned about the second plane by raising and lowering lift 103 and/or by operating lift 103 to adjust the vertical positioning of dispensing receptacle 105.

Dispensing receptacle 105 may have a trapezoidal, conical, cubic, or other volumetric shape with angled walls and an open top side. The size and shape of dispensing receptacle 105 may vary based on the size and/or quantity of items that are to be retained in dispensing receptacle 105, wherein the size and shape may relate to the total capacity or volume of dispensing receptacle 105 and may be defined by the height of the walls and the distance between the walls of dispensing receptacle 105. For instance, dispensing receptacle 105 may have a larger volume when 3D sortation robot 100 is tasked with transporting and dispensing large objects, boxes, and/or packages, and may have a smaller volume when 3D sortation robot 100 is tasked with transporting and dispensing small objects, boxes, and/or packages.

Dispensing receptacle 105 may be attached to lift 103 with rotatable hinge 107, one or more actuators 109, and one or more sensors 111. Actuators 109 may be controlled by processors 309. Actuators 109 may position dispensing receptacle 105 upright during transport, when receiving one or more items into dispensing receptacle 105, and/or as a default position. Actuators 109 may also tilt dispensing receptacle 105 to one or more sides when dispensing the items from dispensing receptacle 105. In some embodiments, actuators 109 may push dispensing receptacle 105 so that dispensing receptacle rotates about the rotatable hinge and one or more walls of dispensing receptacle 105 are angled downwards. In the titled position, gravity may force the contents in dispensing receptacle 105 to slide out from dispensing receptacle 105 and into another receptacle, box, or other container that is adjacent and/or below a height of the tilted dispensing receptacle 105. Accordingly, actuators 109 may control the dispensing or dispensement of items from dispensing receptacle 105.

In some embodiments, one or more sensors 111 may include orientation sensors or gyroscopes. In some such embodiments, one or more sensors 111 may be used to determine the angle and/or position of dispensing receptacle 105.

In some embodiments, one or more sensors 111 may include laser counters, imaging devices, weight sensors, and/or other sensors with which track a quantity of items placed in and/or dispensed from dispensing receptacle 105. For instance, one or more sensors 111 may emit a beam across a top of dispensing receptacle 105. When the beam is temporarily blocked when the dispensing receptacle 105 is in an upright position, one or more sensors 111 may determine that an item has been placed inside dispensing receptacle 105. Similarly, when the beam is temporarily blocked when the dispensing receptacle 105 is in a tilted position, one or more sensors 111 may determine that an item has been dispensed out from dispensing receptacle 105.

In some embodiments, one or more sensors 111 may also include imaging cameras or fiducial scanners that are orientated towards either side of dispensing receptacle 105. The imaging cameras or fiducial scanners may be used to scan fiducials that demarcate different locations assigned for fulfillment of different orders, and 3D sortation robot 100 may align dispensing receptacle 105 using the scanned fiducials, and may determine which direction to tilt and/or rotate dispensing receptacle 105 based on the scanned fiducials.

Figure 4:
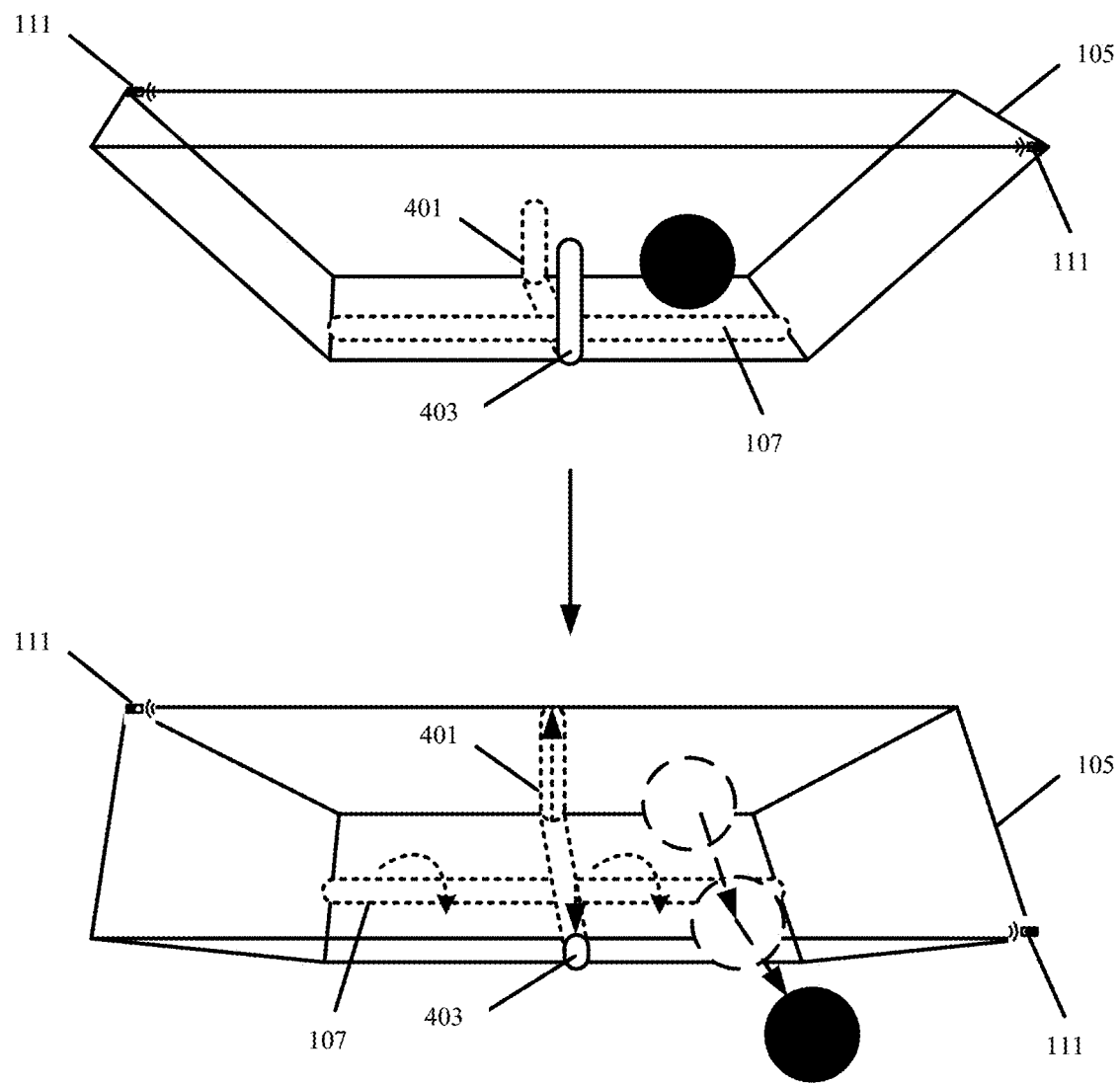
FIG. 4 illustrates example operation of a dispensing receptacle using a first piston on a first side of the dispensing receptacle and a second piston on a second side of the dispensing receptacle in accordance with some embodiments presented herein.

In some embodiments, actuators 109 may include one or more pistons for tilting dispensing receptacle 105 to more or more sides and for returning dispensing receptacle 105 to an upright position. FIG. 4 illustrates example operation of dispensing receptacle 105 using first piston 401 on a first side of dispensing receptacle 105 and second piston 403 on a second side of dispensing receptacle 105 in accordance with some embodiments presented herein. As shown in FIG. 4, first piston 401 on a first side of dispensing receptacle 105 may raise, and second piston 403 on a second side of dispensing receptacle 105 may lower to cause dispensing receptacle 105 to tilt about rotatable hinge 107 and turn towards the second side. Consequently, gravity may shift any items inside dispensing receptacle 105 towards the second side and out of dispensing receptacle 105. One or more sensors 111 may detect when the items fall out or are dispensed from dispensing receptacle 105.

Lowering first piston 401 and raising second piston 403 may cause dispensing receptacle 105 to tilt and/or rotate over to the opposite first side. Accordingly, the items inside dispensing receptacle 105 may be dispensed to either the left or right sides of dispensing receptacle 105 depending on the operation of first piston 401 and second piston 403. Moreover, first piston 401 and second piston 403 may return and hold dispensing receptacle 105 in an upright position by raising to equal heights on each side of dispensing receptacle

105. 3D sortation robot 100 may configure dispensing receptacle 105 when receiving and/or carrying items.

In some embodiments, first piston 401 and second piston 403 may be connected to a set of articulating brackets. The articulating brackets may connect to one of first piston 401 or second piston 403 on one end, and may connect to one side of dispensing receptacle 105 on an opposite end. The articulating brackets may guide the rotation of dispensing receptacle 105 about rotatable hinge 107 and/or may distribute the force applied by one of first piston 401 and second piston 403 across a side of dispensing receptacle 105 rather than having the force be applied to a single point about a side of dispensing receptacle 105.

Figure 5:
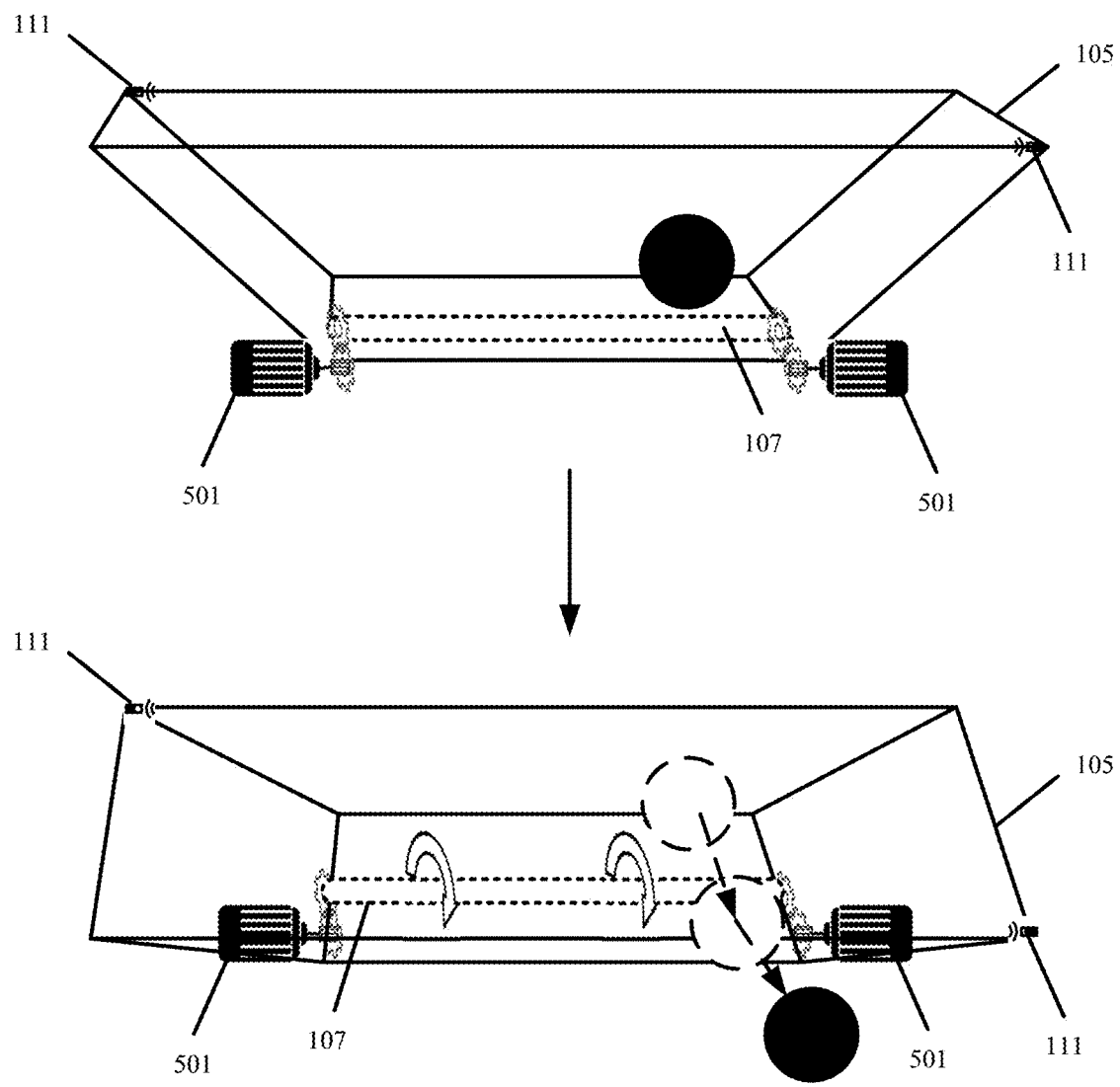
FIG. 5 illustrates example operation of the dispensing receptacle using one or more motors in accordance with some embodiments presented herein.

In some embodiments, actuators 109 may include one or more motors for tilting and/or rotating dispensing receptacle 105 to more or more sides and for returning dispensing receptacle 105 to an upright position. FIG. 5 illustrates example operation of dispensing receptacle 105 using one or more motors 501 in accordance with some embodiments presented herein.

As shown in FIG. 5, motors 501 may be connected to an axle and/or one or more gears that connect to rotatable hinge 107. Dispensing receptacle 105 may tilt and/or rotate towards a first side when motors 501 turn in a first direction, and may tilt and/or rotate towards an opposite second side when motors 501 turn in an opposite second direction.

Figure 6:
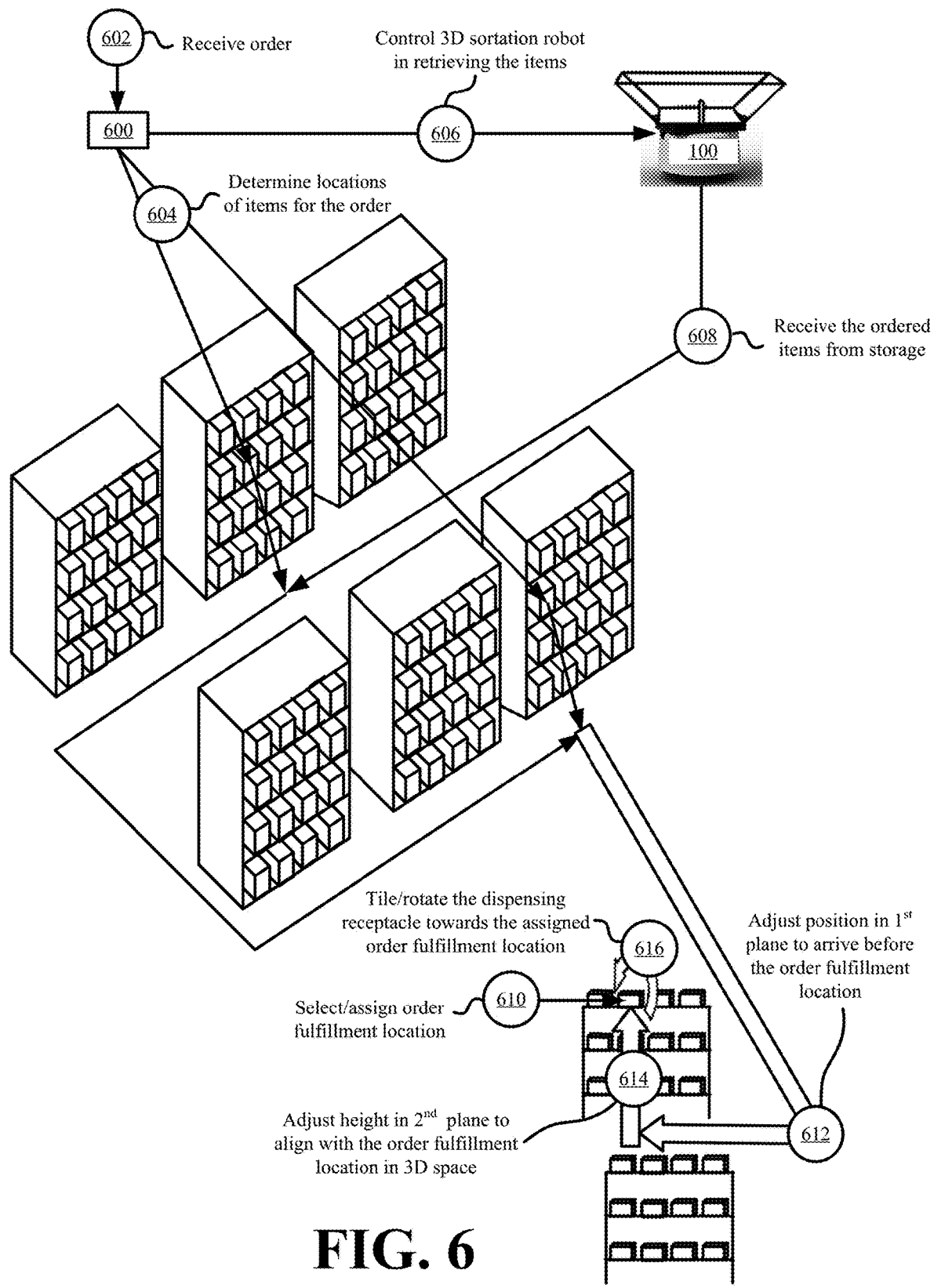
FIG. 6 illustrates example operation of the 3D sortation robot in accordance with some embodiments presented herein.

FIG. 6 illustrates example operation of 3D sortation robot 100 in accordance with some embodiments presented herein. 3D sortation robots 100 may operate under control of controller 600. More specifically, controller 600 may provide wireless and/or remote messages to 3D sortation robots 100 to control the movements motorized base 101 and lift 103 in properly aligning dispensing receptacle 105 for 3D sortation, and/or activation of actuators 109 to tilt and/or rotate dispensing receptacle 105 in order to dispense carried items to different positions and heights about first and second planes.

Controller 600 may receive (at 602) an order, may determine (at 604) locations within a site where one or more items of the order are stored, and may control (at 606) 3D sortation robot 100 in retrieving (at 608) the one or more items. In some embodiments, controller 600 may direct 3D sortation robot 100 to the storage locations of the one or more items, and a human worker or another robot may transfer the one or more items into dispensing receptacle 105 of 3D sortation robot 100. Sensors 111 may detect when the one or more items are placed into dispensing receptacle 105, and 3D sortation robot 100 may message controller 600 upon receiving the one or more items.

Controller 600 may select (at 610) an order fulfillment location for the order from a plurality of order fulfillment locations distributed across multiple planes and/or different heights. For instance, the order fulfillment locations may correspond to one or more racks that have shelving or rows at different heights. Each shelf or row may contain boxes, containers, and/or other receptacles into which items of a different order may be aggregated. In other words, each box, container, and/or other receptacle may be used to fulfill a different order. Accordingly, controller 600 may notify 3D sortation robot 100 of a particular x, y, and z position for the order fulfillment location assigned to the order being fulfilled by 3D sortation robot 100.

3D sortation robot 100 may transfer (at 612) the one or more items of the order to the x and y position of the assigned order fulfillment location. Specifically, 3D sortation robot 100 may move (at 612) about the first plane or a ground surface until arriving before the assigned order fulfillment location. 3D sortation robot 100 may use sensors 307 to scan fiducials and/or other salient queues positioned about the ground surface or along the navigable path to determine the precise location of the assigned order fulfillment location.

3D sortation robot 100 may then raise (at 614) lift 103 to align with or match a height of the assigned order fulfillment location about a second plane (e.g., the z position of the assigned order fulfillment location). In some embodiments, 3D sortation robot 100 may raise (at 614) dispensing receptacle 105 to be elevated over the assigned order fulfillment location. 3D sortation robot 100 may use sensors 111 and/or other sensors located about dispensing receptacle 105 or lift 103 to scan a fiducial and/or another identifier that demarcates the assigned order fulfillment location from other order fulfillment locations.

3D sortation robot 100 may activate actuators 109 to tilt (at 616) or rotate dispensing receptacle 105 in the direction of, towards, and/or over the assigned order fulfillment location so that the one or more items within dispensing receptacle 105 may slide out of dispensing receptacle 105 and into the assigned order fulfillment location. Specifically, 3D sortation robot 100 may determine whether the assigned order fulfillment location is to the right or left of dispensing receptacle 105 using one or more sensors, and may tilt or rotate dispensing receptacle 105 in the determined direction of the assigned order fulfillment location.

3D sortation robot 100 may notify controller 600 once the one or more items are dispensed from dispensing receptacle 105. In some embodiments, 3D sortation robot 100 may use one or more of its sensors to scan a fiducial that encodes a value for the assigned order fulfillment location, and may submit, to controller 600, the fiducial along with an indication of the one or more items dispensed to the assigned order fulfillment location. Controller 600 may determine if the dispensed items fulfill the order.

If the order is complete, controller 600 may control 3D sortation robot 100 in retrieving and dispensing items for other orders being fulfilled at other order fulfillment locations. Otherwise, controller 600 may control 3D sortation robot 100 in retrieving and dispensing a next item for the order being fulfilled.

In some embodiments, 3D sortation robot 100 may receive and dispense a single item of an assigned order at one time. In some such embodiments, controller 600 may control different 3D sortation robots 100 in receiving and dispensing different items of the same order to the assigned order fulfillment location. In some embodiments, 3D sortation robot 100 may receive and dispense all or multiple items of an assigned order at one time.

The multi-plane or 3D sortation performed by 3D sortation robot 100 increases the number of orders that may be fulfilled in a given space or region because multiple orders may be fulfilled at the same x, y position of the first plane but at different z positions of the second plane. Accordingly, order fulfillment may be performed in a smaller space than would be needed when performing sortation and/or order fulfillment along different positions of a single plane (e.g., different positions about the first plane but the same position about the second plane). To further accelerate order fulfillment, controller 600 may coordinate the simultaneous operation of multiple 3D sortation robots 100.

Figure 7:
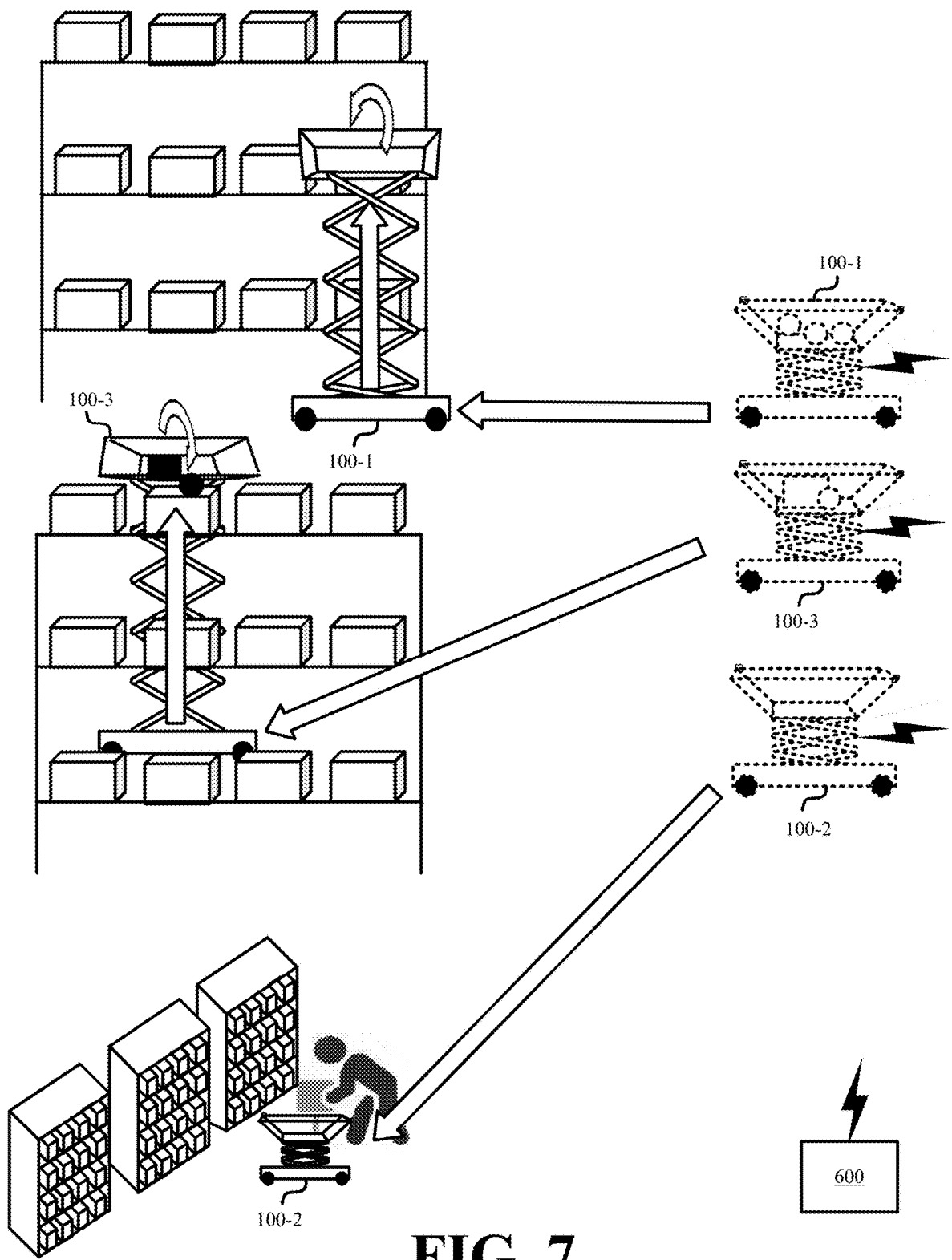
FIG. 7 illustrates an example of coordinating the simultaneous operation of multiple 3D sortation robots in accordance with some embodiments presented herein.

FIG. 7 illustrates an example of controller 600 coordinating the simultaneous operation of multiple 3D sortation robots 100 in accordance with some embodiments presented herein. As shown in FIG. 7, controller 600 may control (at 702) each of first robot 100-1, second robot 100-2, and third robot 100-3 differently. First robot 100-1 may deposit (at 704) a first item of a first order to a container at a first position and height about the first and second planes, second robot 100-2 may receive a second item of the first order from storage while first robot 100-1 is depositing the first item, and third robot 100-3 may deposit one or more items of a second order to a container at a second position and height about the first and second planes without conflict with first robot 100-1.

The 3D sortation across the first and second planes allows several orders to be fulfilled at the same as many more order fulfillment locations are accessible in the same space than if the order fulfillment locations were only distributed about a single plane. Controller 600 may use various techniques to minimize obstacles and conflict between 3D sortation robots 100 dispensing items for different orders at the same time.

For instance, controller 600 may form a first lane in which 3D sortation robots 100 may move in a first direction about the first plane, and a second lane in which 3D sortation robots 100 may move in an opposite second direction about the second plane. 3D sortation robots 100 may exit the first lane upon arriving at an order fulfillment location, and may position themselves adjacent to the order fulfillment location. After dispensing items to the order fulfillment locations, 3D sortation robots 100 may enter the first lane or the second lane to receive additional items for the same or other orders.

Figure 8:
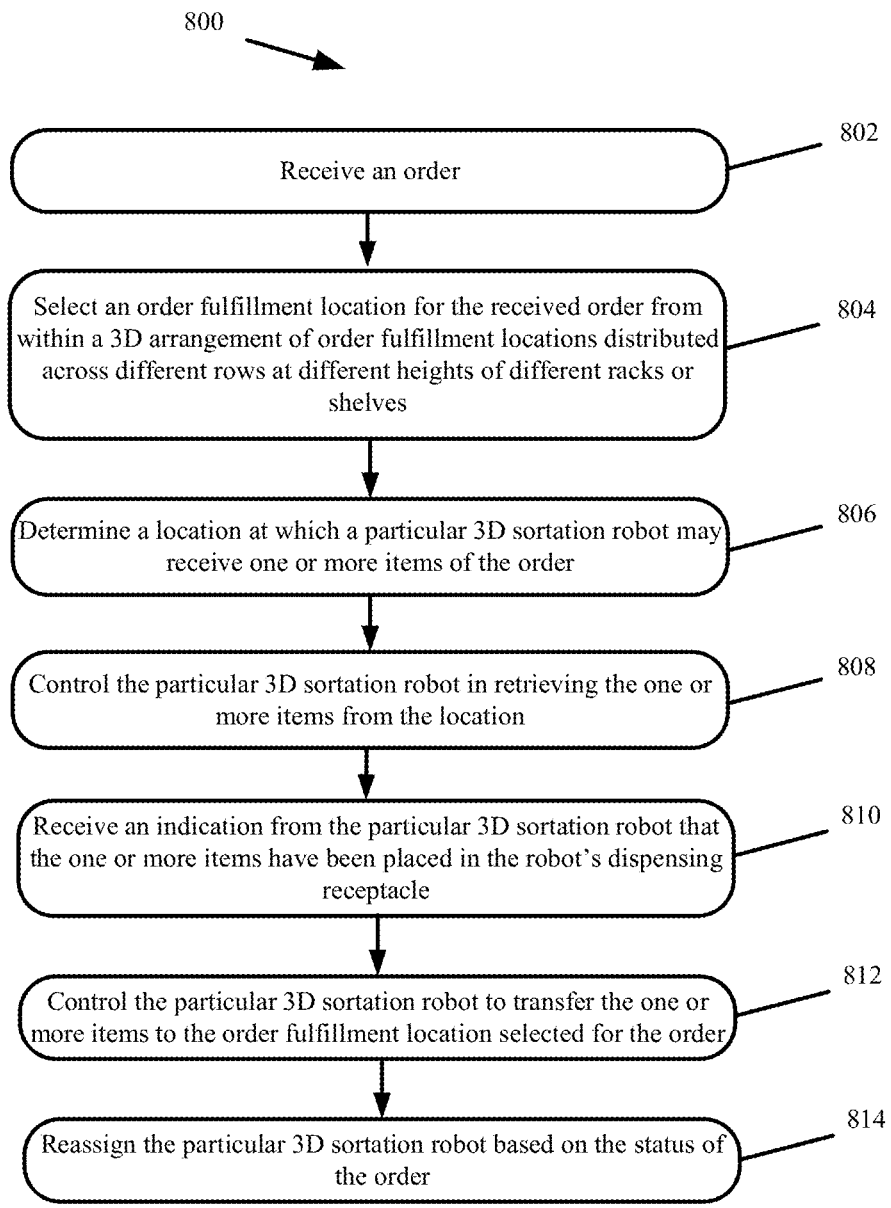
FIG. 8 presents a process for coordinating a 3D sortation of items for different orders across multiple planes in accordance with some embodiments presented herein.

FIG. 8 presents a process 800 for coordinating a 3D sortation of items for different orders across multiple planes in accordance with some embodiments presented herein. Process 800 may be implemented by controller 600, and may involve controller 600 controlling the operation of one or more 3D sortation robots 100 and/or other robots or agents in a site.

Process 800 may include receiving (at 802) an order pending fulfillment. The order may specify one or more items that are distributed across the site.

Process 800 may include selecting (at 804) an order fulfillment location for the received order from within a 3D arrangement of order fulfillment locations distributed across different rows at different heights of different racks or shelves. The controller may track the location of each order fulfillment location, and each order that is already assigned to an order fulfillment location. In some embodiments, the location of each order fulfillment location may be associated with a fiducial or other identifier that is presented at that location. For instance, stickers for different fiducials may be placed on the shelves or rows of the racks to demarcate the different order fulfillment locations. The 3D sortation robots may scan the fiducials to identify the correct order fulfillment location for an order that is being fulfilled.

Process 800 may include determining (at 806) a location at which a particular 3D sortation robot may receive one or more items of the order. The controller may track and/or map the locations for the different items, or may receive input from other robots or devices of workers that indicate when the items have been picked and where they may be received by one or more 3D sortation robots. In some embodiments, the location may correspond to a location where each item is stored in the site. In some embodiments, the location may correspond to a location of an item cache where items of orders are aggregated for subsequent sortation to individual orders at the different order fulfillment locations by the 3D sortation robots.

Process 800 may include controlling (at 808) the particular 3D sortation robot in retrieving the one or more items from the location. In some embodiments, the controller may provide the location of the one or more items to the particular 3D sortation robot, and the particular 3D sortation robot may navigate the site to arrive at the location using positional beacons, navigational fiducials, a mapping of the site, and/or other data. Another robot or agent may place the one or more items into the dispensing receptacle of the particular 3D sortation robot.

Process 800 may include receiving (at 810) an indication from the particular 3D sortation robot that the one or more items have been placed in the robot's dispensing receptacle. For instance, the particular 3D sortation robot may receive sensor output that verifies the placement of the one or more items in the dispensing receptacle, and the particular 3D sortation robot 100 may provide a message to the controller to confirm receipt of the one or more items.

Process 800 may include controlling (at 812) the particular 3D sortation robot to transfer the one or more items to the order fulfillment location selected for the order. In some embodiments, the controller may provide the position of the selected order fulfillment location to the particular 3D sortation robot. In some embodiments, the controller may provide the fiducial that identifies the order fulfillment location to the particular 3D sortation robot, and the particular 3D sortation robot may use positional beacons, navigational fiducials, a mapping of the site, and/or other data to arrive at the selected order fulfillment location and to raise or lower its lift so that the dispensing receptacle containing the one or more items is aligned with a box, container, or other receptacle at the selected order fulfillment location. Controlling (at 812) the particular 3D sortation robot may further include activating the actuators that control the dispensing receptacle to transfer the one or more items from the dispensing receptacle into the box, container, or other receptacle at the selected order fulfillment location.

Process 800 may include reassigning (at 814) the particular 3D sortation robot based on the status of the order. If the order is not complete and pending additional items, the controller may control the particular 3D sortation robot in transferring the additional items to the selected order fulfillment location. Otherwise, the controller may control the particular 3D sortation robot in transferring items of other orders to their corresponding order fulfillment locations.

Figure 9:
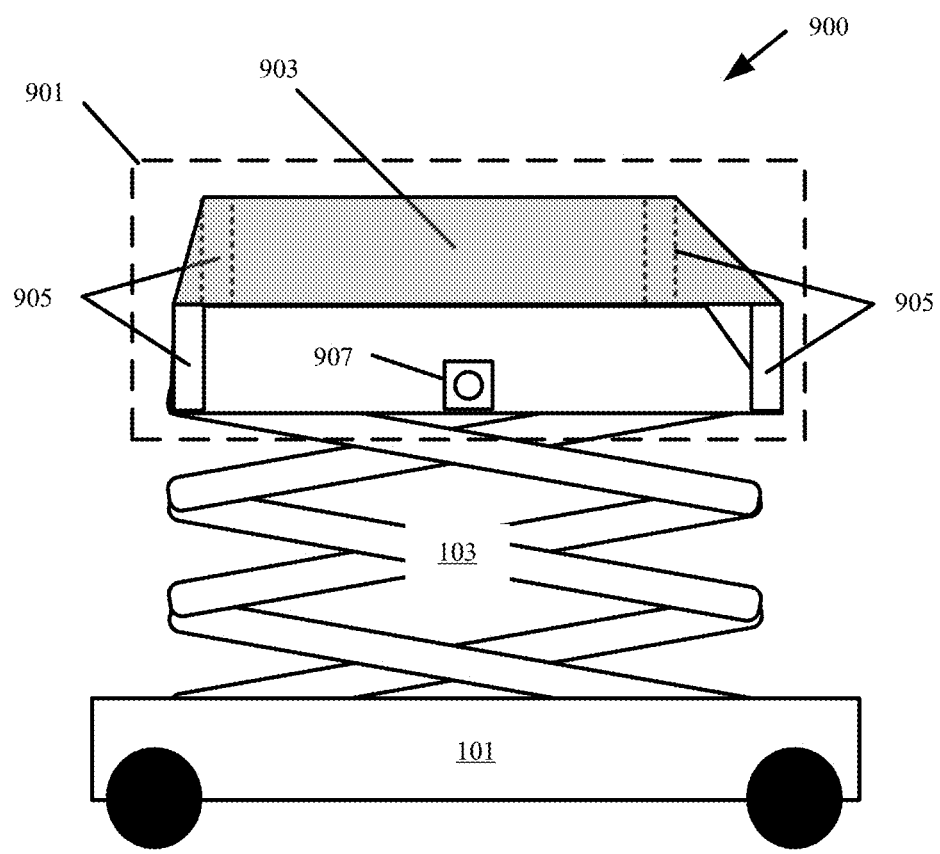
FIG. 9 illustrates an example of an alternative dispensing receptacle for 3D sortation of items in accordance with some embodiments.

In some embodiments, the dispensing receptacle of the 3D sortation robots may be modified to sort items to locations and heights of different order fulfillment locations using different mechanical elements. FIG. 9 illustrates an example of 3D sortation robot 900 with alternative dispensing receptacle 901 for 3D sortation of items in accordance with some embodiments.

As shown in FIG. 9, dispensing receptacle 901 may include flat surface or platform 903 that is attached to lift 103. Actuators 905 under platform 903 may be used to tilt and/or raise platform 903 on one side so that items carried atop platform 903 slide down to the opposite side. Sensors 907 may be located underneath platform 903 to align dispensing receptacle 901 to different heights of different order fulfillment locations.

Figure 10:
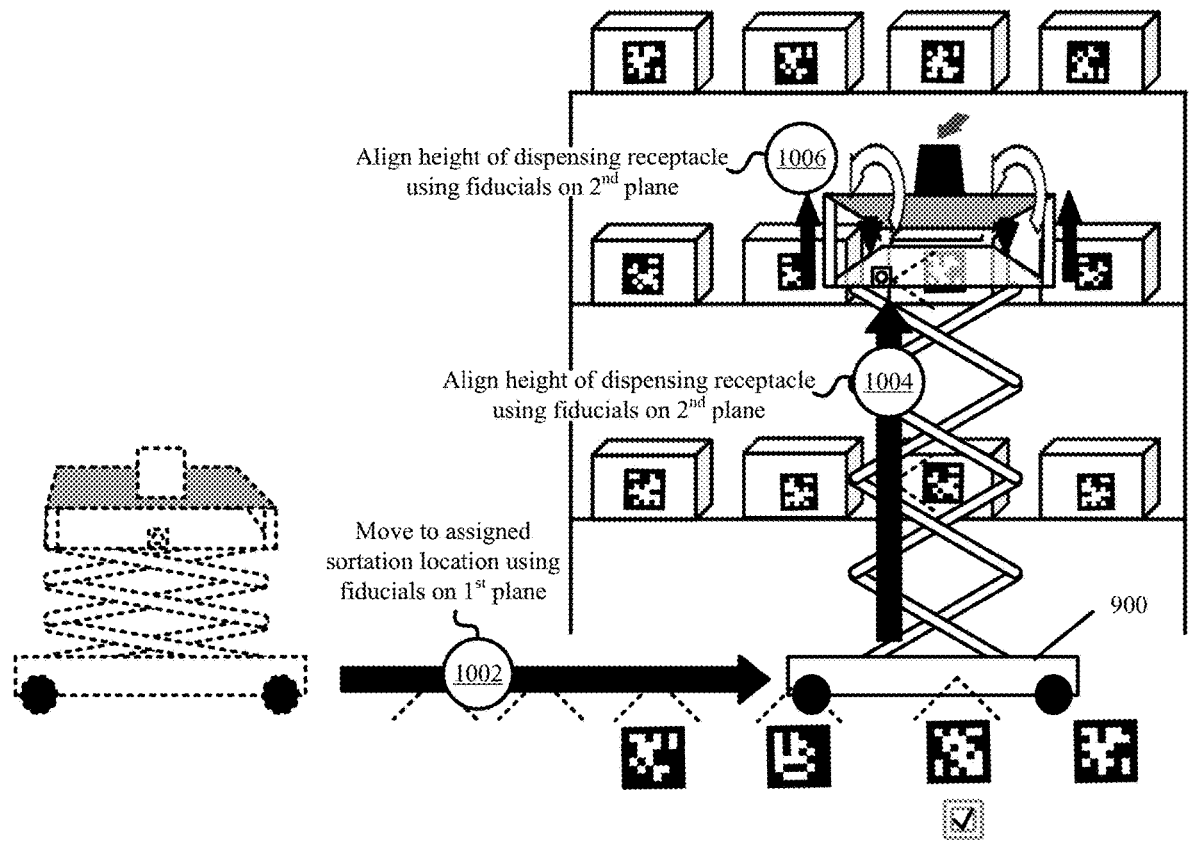
FIG. 10 illustrates an example of using the alternative dispensing receptacle to perform 3D sortation in accordance with some embodiments presented herein.

FIG. 10 illustrates an example of using dispensing receptacle 901 to perform 3D sortation in accordance with some embodiments presented herein. 3D sortation robot 900 may use its sensory array to scan (at 1002) fiducials along the first plane and/or to control movements of motorized base 101 to bring 3D sortation robot 900 before an assigned sortation location. 3D sortation robot 900 may also use the sensory array to scan (at 1004) fiducials while raising and/or lowering lift 103 in order to align a height of dispensing receptacle 901 with the top of a box, container, or another receptacle at the assigned sortation location. 3D sortation robot 900 may tilt and/or lower (at 1006) platform 903 in direction of the assigned sortation location to slide the items off platform 903 and into the box, container, or another receptacle at the assigned sortation location.

In some embodiments, the modified dispensing receptacle may include a plunger, piston, or ram that moves across platform 903 to push items to one or more sides of platform 903. In some embodiments, the modified dispensing receptacle may include a conveyor or movable track that is embedded within platform 903, and items may be placed atop the conveyor. Motors may control the direction in which the conveyor turns. Turning the conveyor in a first direction may move items off a first side of platform 903, and turning the conveyor in a second direction may move items off a second side of platform 903.

Figure 11:
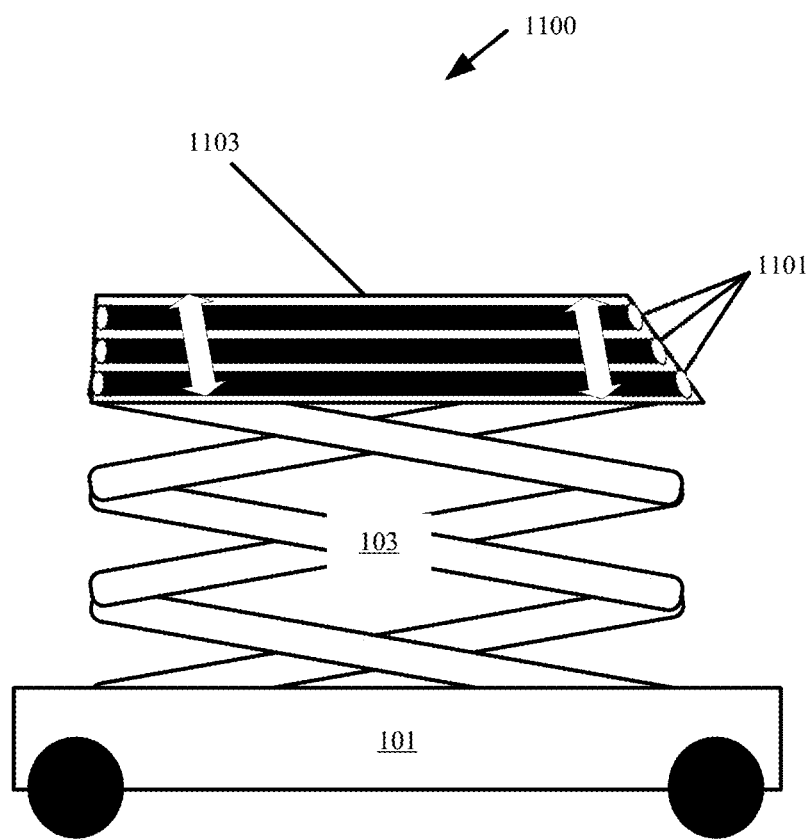
FIG. 11 illustrates an example of a 3D sortation robot with an integrated conveyor to perform a 3D sortation of items in accordance with some embodiments presented herein.

FIG. 11 illustrates an example of 3D sortation robot 1100 with integrated conveyor 1101 to perform a 3D sortation of items in accordance with some embodiments presented herein. 3D sortation robot 1100 may include motorized base 101 and lift 103 that allow 3D sortation robot 1100 to align an item or object placed atop platform 1103 with the position of a sortation location in 3D space. Once the sortation location is aligned to a particular side of platform 1103, 3D sortation robot 1100 may activate conveyor 1101 to move the item or object atop platform 1103 towards the particular side and off platform 1103.

In some embodiments, conveyor 1101 may include a belt that is integrated into platform 1103. The belt may wrap around a pair of drive motors located at either end of the belt and/or platform 1103. The drive motors may turn or more the belt towards the left or right sides of 3D sortation robot 1100 in order to dispense an item from platform 1103 to an aligned 3D sortation location on either side of 3D sortation robot 1100.

In some embodiments, conveyor 1101 may include a set of motorized rollers that are positioned parallel to the surface of platform 1103. The set of motorized rollers may turn in two directions to move the item atop platform 1103 in either direction.

Figure 12:
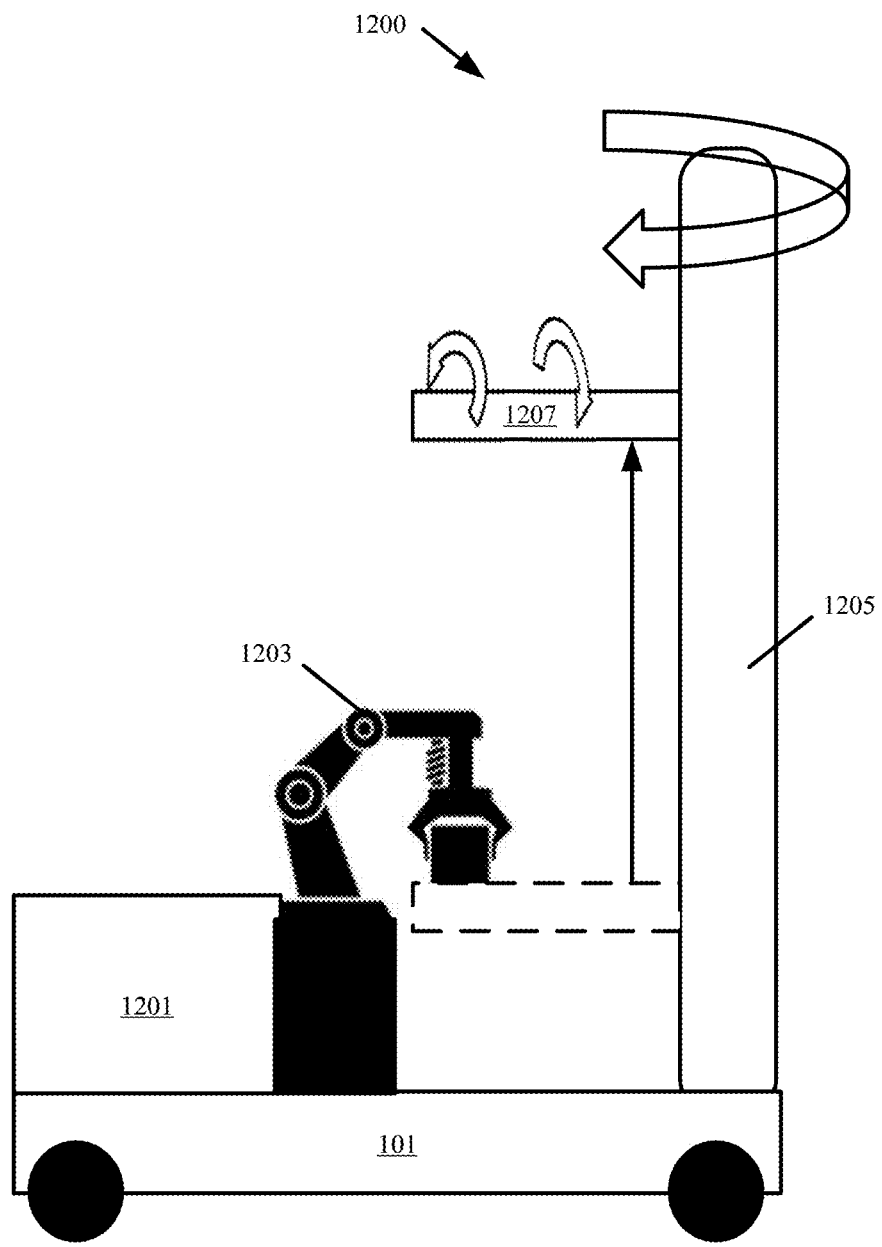
FIG. 12 illustrates an example of a 3D sortation robot for performing multiple item 3D sortation in accordance with some embodiments.

In some embodiments, the 3D sortation robot may be modified to sort multiple items in a single pass. FIG. 12 illustrates an example of 3D sortation robot 1200 for performing multiple item 3D sortation in accordance with some embodiments. 3D sortation robot 1200 may include motorized base 101, storage receptacle 1201, retrieval element 1203, lift 1205, and tilting platform 1207.

Storage receptacle 1201 may include a bin or container that is attached to motorized base 101. Multiple items may be placed inside storage receptacle 1201 and carried by 3D sortation robot 1200 to different sortation locations in a single pass.

Retrieval element 1203 may include a robotic arm or other mechanical grabbing element for transferring different items from storage receptacle 1201 onto tilting platform 1207 when tilting platform 1207 is at a lower position. Retrieval element 1203 may include one or more sensors or cameras to aid the robotic arm in selecting specific items from storage receptacle 1201 and/or in sensing whether an item has been properly engaged.

Lift 1205 may include a mechanism that elevates tilting platform 1207 to a plurality of heights. In some embodiments, lift 1205 may include a fixed structure with a system of motorized pulleys or gears that move tilting platform 1207 up and down. In some embodiments, lift 1205 may include a collapsible structure such as lift 103 described above. In some embodiments, lift 1205 may include a motor that rotates lift 1205 and/or tilting platform 1207 around 3D sortation robot 1200.

Tilting platform 1207 may include a flat surface onto which retrieval element 1203 may place different items. Motorized base 101 and lift 1205 may be used to align tilting platform 1207 with different sortation locations in 3D space. Once aligned, tilting platform 1207 may rotate about a center point to slide any items placed atop tilting platform 1207 off a left or right side of 3D sortation robot 1200.

3D sortation robot 1200 may perform multiple item 3D sortation by receiving into storage receptacle 1201 multiple items that require 3D sortation to different sortation locations. 3D sortation robot 1200 may operate lift 1205 to lower tilting platform 1207 to a first height, and may operate retrieval element 1203 in placing a first item from storage receptacle 1201 onto tilting platform 1207. Retrieval element 1203 and/or one or more sensors may scan the first item to determine a first sortation location that is selected for the first item. 3D sortation robot 1200 may move to and align with the first sortation location by operating motorized base 101 and lift 1205. Once aligned, 3D sortation robot 1200 may activate tilting platform 1207 to tilt towards the first sortation location in order to deposit the first item into the first sortation location. 3D sortation robot 1200 may tilt tilting platform 1207 back to a parallel orientation, may lower tilting platform 1207 down to the first height using lift 1205, and may operate retrieval element 1203 in placing a next item from storage receptacle 1201 onto tilting platform 1207 for a next 3D sortation at a second sortation location.

In some embodiments, tilting platform 1207 may be replaced with the conveyor-integrated platform of 3D sortation robot 1100. In some such embodiments, retrieval element 1203 may place an item on the conveyor-integrated platform, lift 1205 may raise the conveyor-integrated platform with a sortation location, and rather than tilt the platform to slide the item into the sortation location, the conveyor-integrated platform may activate conveyor 1101 in order to move the item off the platform and into the sortation location.

In some embodiments, 3D sortation robot 100 may be modified to perform the multiple item 3D sortation. For instance, 3D sortation robot 100 may be modified to include storage receptacle 1201 and retrieval element 1203 adjacent to lift 103 and dispensing receptacle 105.

Figure 13:
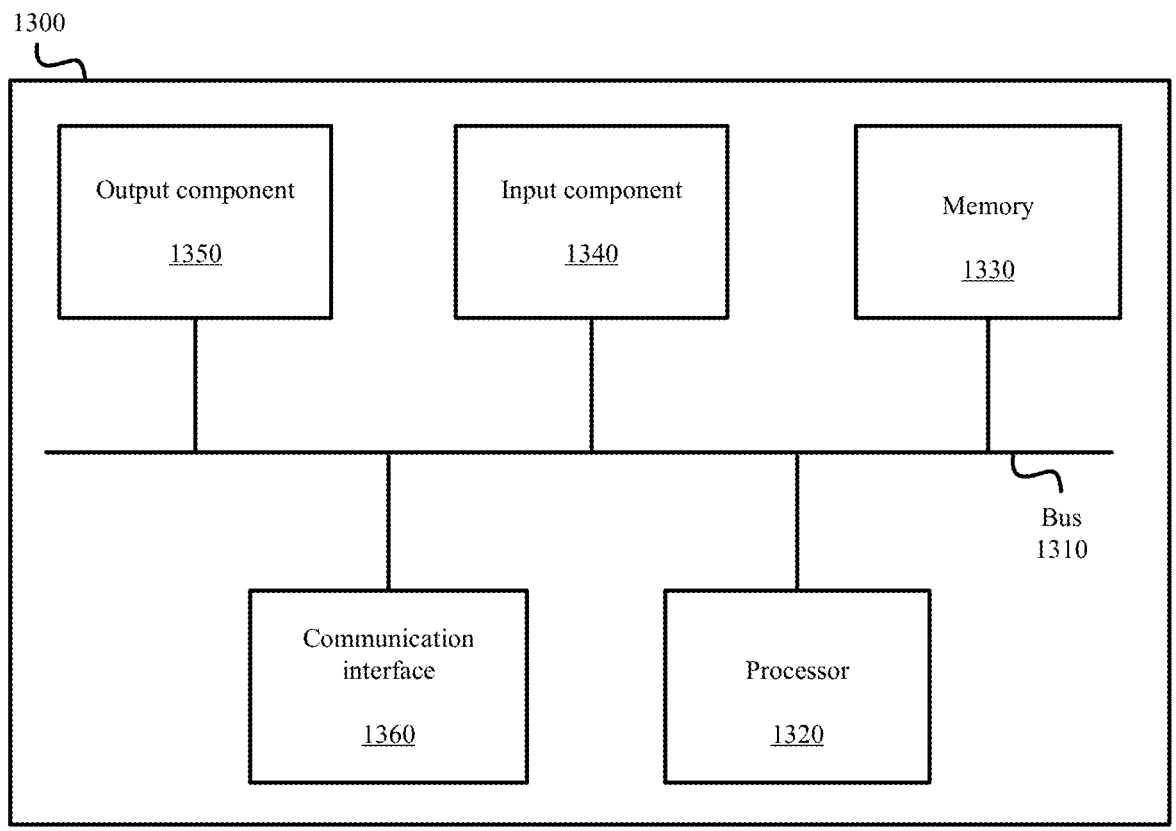
FIG. 13 illustrates example components of one or more devices, according to one or more embodiments described herein.

FIG. 13 is a diagram of example components of device 1300. Device 1300 may be used to implement one or more of the devices or systems described above (e.g., controller 600, parts of the 3D sortation robots, etc.). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A robot comprising:
    a motorized base that moves the robot along a first plane;
    a dispensing receptacle attached to a lift, wherein the lift moves the dispensing receptacle to a plurality of heights about a second plane; and
    one or more actuators controlling a dispensing of one or more items from the dispensing receptacle to a right side and a left side of the robot.

2. The robot of claim 1, wherein the one or more actuators are connected to the dispensing receptacle, and wherein the one or more actuators modify a position of the dispensing receptacle from an upright position to a first tilted position in which the dispensing receptacle is tilted towards the right side of the robot and to a second tilted position in which the dispensing receptacle is tilted towards the left side of the robot.

3. The robot of claim 1, wherein the dispensing receptacle comprises:
a plurality of angled walls configured to store the one or more items when the dispensing receptacle is in an upright position, and wherein the one or more actuators control the dispensing of the one or more items from the dispensing receptacle by tilting the dispensing receptacle to one of the right side or the left side.

4. The robot of claim 1 further comprising:
one or more sensors positioned about the dispensing receptacle, wherein the one or more sensors detect an orientation of the dispensing receptacle and differentiate between the dispensing receptacle in an upright position, a first tilted position to the right side, and a second tilted position to the left side.

5. The robot of claim 1 further comprising:
one or more sensors positioned about the dispensing receptacle, wherein the one or more sensors detect the one or more items entering the dispensing receptacle when in an upright position, and the one or more items being dispensed from the dispensing receptacle when tilted towards one of the right side or the left side.

6. The robot of claim 1 further comprising:
one or more sensors that generate output for controlling the lift, wherein the one or more sensors detect alignment of the dispensing receptacle with a dispensing location about the second plane.

7. The robot of claim 1,
wherein the dispensing receptacle comprises a flat surface; and
wherein the one or more actuators comprise a first pair of actuators that are connected to corners of the flat surface about the right side of the robot, and a second pair of actuators that are connected to corners of the flat surface about the left side of the robot.

8. The robot of claim 1 further comprising:
one or more sensors; and
one or more processors configured to:
control movements of the motorized base to position the robot at a particular location in the first plane that matches a position of an assigned destination location in the first plane using first output from the one or more sensors;
control a raising and lowering of the dispensing receptacle with the lift to align the dispensing receptacle with a height of the assigned destination location in the second plane using second output from the one or more sensors; and
activate the one or more actuators to dispense the one or more items from the dispensing receptacle in a direction of the assigned destination location.

9. The robot of claim 1, wherein the one or more actuators comprise:
a first actuator that is connected to the dispensing receptacle about the right side;
a second actuator that is connected to the dispensing receptacle about the left side; and
wherein controlling the dispensing of the one or more items from the dispensing receptacle to the right side comprises tilting the dispensing receptacle towards the right side by lowering the first actuator and raising the second actuator.

10. The robot of claim 9, wherein the first actuator and the second actuator correspond to pistons that raise and lower to a set of heights.

11. The robot of claim 1 further comprising:
a rotatable hinge that is located under the dispensing receptacle and that provides a pivot point on which the dispensing receptacle tilts to the right side and the left side.

12. The robot of claim 11, wherein the one or more actuators comprise:
a motor that is connected to the rotatable hinge, wherein the motor turns in a first direction to tilt the dispensing receptacle towards the right side, and turns in an opposite second direction to tilt the dispensing receptacle towards the left side.

13. A method comprising:
receiving one or more items in a dispensing receptacle of a robot at a first position;
selecting a destination location for an order comprising the one or more items from a three-dimensional arrangement of a plurality of order fulfillment locations that are distributed across different rows at different heights;
controlling movements of the robot to move the robot from the first position to a second position in a first plane that matches a position of the destination location in the first plane;
aligning the dispensing receptacle with a height of the destination location in a second plane by activating a lift of the robot; and
dispensing the one or more items from the dispensing receptacle to the destination location at one side of the robot.

14. The method of claim 13, wherein dispensing the one or more items comprises:
activating one or more actuators that are connected to the dispensing receptacle to tilt the dispensing receptacle from an upright position towards the destination location.

15. The method of claim 13 further comprising:
receiving output from one or more sensors of the robot; and
wherein controlling the movements of the robot comprises adjusting the movements based on the output from the one or more sensors.

16. The method of claim 15 further comprising:
detecting an alignment of the dispensing receptacle with the height of the destination location based on the output from the one or more sensors.

17. The method of claim 13 further comprising:
receiving a first notification from the robot in response to the robot receiving the one or more items.

18. The method of claim 17 further comprising:
receiving a second notification from the robot in response to the robot dispensing the one or more items to the destination location, wherein the second notification comprises an identifier that is scanned by the robot at the destination location.

19. A method comprising:
receiving one or more items in a dispensing receptacle of a robot at a first position;
receiving a first notification from the robot in response to the robot receiving the one or more items;
controlling movements of the robot to move the robot from the first position to a second position in a first plane that matches a position of an assigned destination location in the first plane in response to receiving the first notification;

aligning the dispensing receptacle with a height of the assigned destination location in a second plane by activating a lift of the robot; and dispensing the one or more items from the dispensing receptacle to the assigned destination location at one side of the robot.

\* \* \* \* \*